United States Patent [19]

Waag

[11] 3,869,412

[45] Mar. 4, 1975

[54] SURFACE-ACTIVE COMPOSITIONS HAVING CONTROLLED FOAMING PROPERTIES AND PROCESS FOR CONTROLLING FOAM THEREWITH

[76] Inventor: Åke Wåag, Kattfotsvagen 3, Stenungsund, Sweden

[22] Filed: Dec. 20, 1971

[21] Appl. No.: 210,161

Related U.S. Application Data

[63] Continuation-in-part of Ser. No. 648,248, June 23, 1967, abandoned, and a continuation-in-part of Ser. No. 117,073, Feb. 19, 1971, Pat. No. 3,741,913, and a continuation-in-part of Ser. No. 16,250, March 3, 1970, abandoned, and a continuation-in-part of Ser. No. 32,430, April 27, 1970, abandoned.

[30] Foreign Application Priority Data

June 23, 1966 Sweden.............................. 8678/66
Mar. 4, 1969 Sweden.............................. 2944/69

[52] U.S. Cl.............. 252/527, 252/DIG. 1, 252/89, 252/321, 252/534, 252/540, 252/559
[51] Int. Cl....... C11d 3/075, C11d 1/78, C11d 1/83
[58] Field of Search........... 252/527, 534, 546, 545, 252/559, 540, 321, 526, 358, 89, DIG. 1

[56] References Cited
UNITED STATES PATENTS

| | | | |
|---|---|---|---|
| 3,004,056 | 10/1961 | Nunn et al..................... | 252/DIG. 1 |
| 3,235,627 | 2/1966 | Mansfield ............................. | 252/89 |
| 3,294,693 | 12/1966 | Dupre et al......................... | 252/135 |
| 3,341,467 | 9/1967 | Hwa................................... | 251/358 |
| 3,400,148 | 9/1965 | Quimby ................................ | 252/89 |
| 3,523,902 | 8/1970 | Schmolka ........................... | 252/559 |

FOREIGN PATENTS OR APPLICATIONS

1,119,884   6/1967   Great Britain..................... 252/540

OTHER PUBLICATIONS

Soap and Chemical Specialties, "Phosphate Surfactants–Properties and Uses," p. 55, 1962, Mayhew.

*Primary Examiner*—John D. Welsh
*Assistant Examiner*—Edith L. Rollins

[57] ABSTRACT

Surface-active compositions are provided having controlled foaming properties comprising an anionic sulphonate or sulphate ester surfactant, a nonionic polyoxyalkylene ether, ester or glycol surfactant, and an anionic polyoxyalkylene phosphate ester surfactant, the polyoxyalkylene phosphate ester and the polyoxyalkylene ether, ester or glycol surfactants serving as low foaming components, and the anionic surfactant increasing the foaming properties of such mixtures in proportion to the amount present. Adjuncts such as builders can also be present.

A process for controlling the foaming properties of anionic sulphate or sulphonate ester surfactants and nonionic polyoxyalkylene ether, ester or glycol surfactants is provided, by combining therewith, in selected amounts, an anionic polyoxyalkylene phosphate ester surfactant to give any desired controlled low to high foaming properties.

28 Claims, No Drawings

SURFACE-ACTIVE COMPOSITIONS HAVING CONTROLLED FOAMING PROPERTIES AND PROCESS FOR CONTROLLING FOAM THEREWITH

This application is a continuation in part of Ser. No. 648,248 filed June 23, 1967 and now abandoned; Ser. No. 117,073 filed Feb. 19, 1971, now U.S. Pat. No. 3,741,913, patented June 26, 1973; Ser. No. 16,250 filed Mar. 3, 1970, and Ser. No. 32,430, filed Apr. 27, 1970, both now abandoned.

Many surfactants have a strong tendency to foam, particularly when solutions thereof are agitated. Such foaming can produce serious problems, such as for example in automatic clothes and dishwashers, in chemical reactions, and in waste water treatment and sewage disposal plants. The problems arising from foam in waste waters being processed in water treatment plants is particularly irksome, and it is accentuated in many cases because the washing detergent compositions used by the public have their natural foaming tendencies enhanced by the addition of foaming agents, to satisfy the housewives' notion that the effectiveness of a washing solution is directly correlated with its tendency to foam.

The foaming tendencies of surfactants can be controlled in various ways, none fully satisfactory. Foam suppressing agents can be added, but these frequently have undesirable side effects. Typical foam-suppressing agents are silicones, fatty alcohols, oils, fats, waxes, and synthetic and natural resins. These, however, add to the cost of the product, because they serve as diluents, and have no surface activity, and cannot contribute to the cleansing, emulsifying and wetting effect. In use, in the course of time, the surfactants may also solubilize the foam-suppressing agent, and thereby destroy its foam-suppressing effectiveness. The foam-suppressing effect of these agents is also rather unpredictable, according to the water in which the composition is used, and is not directly proportional to the amount used.

Surfactants vary considerably in their foaming properties. Generally speaking, nonionic surfactants tend to foam much less than anionic surfactants, but combinations of nonionic and anionic surfactants may foam at least as much as the anionic surfactant, and in some cases may display an enhanced foaming activity that is greater than either alone. Alkyl aryl sulphonates, for example, have a very high foaming power, and mixtures thereof with nonionic surfactants usually display an at least equal foaming power, even when rather large amounts of the nonionic surfactant are employed. Consequently, the foaming tendencies of anionic surfactants combined with nonionic surfactants can present an even greater problem. Similar problems are found with the alkyl sulphate surfactants, and the aliphatic sulphonate and sulphate surfactants.

Some types of surfactants have a very low foaming power. Alkyl phosphate esters in which the alkyl group has from eight to twenty carbon atoms are described in French Pat. No. 1,454,195 as having the property of suppressing the foaming tendency of anionic surfactants such as alkyl benzene sulphonates. However, these phosphate esters are insolubilized by the calcium and magnesium salts commonly found in hard water, and form precipitates. These are, therefore, very poor surfactant, cleansing and emulsifying agents.

Mayhew and Krupin, in an article entitled "Phosphate Surfactants: Properties and Uses," *Soap and Chemical Specialties* April 1962, pages 55 to 58, and 95, describe a series of complex phosphate ester surfactants in which the organic radical is an alkyl or alkylaryl oxyalkylene oxide condensate. These compounds can have one or two such organic groups, and have many of the properties of nonionic detergents, but are classified by Mayhew and Krupin as moderate foamers, foaming more than their nonionic bases, but substantially less than the sulphated and sulphonated anionic surfactants. They are also said to have good surface tension and wetting properties, although somewhat inferior to their nonionic bases, but their cotton and hard surface detergency properties are comparable. Further information on these phosphate surfactants is given in U.S. Pat. No. 3,235,627 issued Feb. 16, 1966 to Mansfield, and U.S. Pat No. 3,294,693, issued Dec. 27, 1966 to Dupre.

In accordance with the invention, surface-active compositions are provided having controlled foaming properties, and comprising a combination of three surfactants, an anionic polyoxyalkylene ether, -ester or -glycol surfactant and a polyoxyalkylene phosphate ester surfactant. Combinations of the polyoxyalkylene ether, -ester or -glycol surfactant and polyoxyalkylene phosphate ester surfactant have very low foaming tendencies, and their foaming tendencies are increased by any desired level by adding thereto an appropriate amount of the anionic sulphate or sulphonate surfactant. In addition to the surfactant components, the compositions can contain organic and inorganic detergent builders, soil-suspending agents, and solvents usually employed in washing and detergent compositions. The compositions of the invention also can be used as surface-active emulsifying agents, in which function they display a controlled foaming tendency.

The relative proportions of the anionic, nonionic and phosphate surfactants can be widely varied, according to the foaming properties desired. In general, however, the proportions of the three surfactant components fall within the following ranges:

| | Overall Range % by weight | Preferred Range % by weight |
|---|---|---|
| Anionic sulphate or sulphonate surfactant | 1 – 95 | 10 – 90 |
| Nonionic polyoxyalkylene ether, -ester or -glycol surfactant | 1 – 95 | 10 – 90 |
| Polyoxyalkylene phosphate ester surfactant | 1 – 95 | 10 – 90 |

The polyoxyalkylene phosphate esters can be described by the following formula:

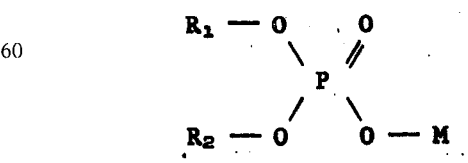

$R_1$ and $R_2$ can be the same or different. One or both of $R_1$ and $R_2$ is a radical containing polyoxyalkylene ether and no more than one of $R_1$ and $R_2$ is hydrogen.

The radical containing polyoxyalkylene ether is of the form

in which n has a value greater than 0, up to about 30, and preferably is within the range from about 1 to about 10, and denotes the average number of oxyalkylene units in the chain. It will be understood that there will be present in admixture species having n values both higher and lower than the average value for n. $R_4$ and $R_5$ are hydrogen or methyl.

$R_3$ is a primary or secondary straight or branched chain saturated or unsaturated aliphatic radical having from about 10 to about 24 carbon atoms, preferably from about 12 to about 22 carbon atoms, or a mono-, di-, or tri-alkyl-substituted phenyl radical having from about 6 to about 24 carbon atoms, and preferably from about 8 to about 18 carbon atoms in the alkyl portion.

M is hydrogen or a water-soluble salt-forming cation such as an alkali metal, such as, for instance, sodium or potassium; ammonia; or an organic amine, such as an alkanolamine or an alkylamine radical, for example, monoethanolamine, diethanolamine, triethanolamine, butylamine, octylamine, or hexylamine.

These polyoxyalkylene phosphate esters are known compounds, and are described in U.S. Pat. Nos. 3,294,693 and 3,235,627 and the disclosure thereof in these patents is hereby incorporated by reference. Additional polyoxyalkylene phosphate esters are described in U.S. Pat. No. 3,400,148, at column 17, and in the Mayhew & Krupin article in *Soap and Sanitary Chemicals*, referred to above. The disclosure thereof in these publications are also incorporated by reference.

Additional polyoxyalkylene phosphate ester surfactants are described in U.S. Pat. No. 3,122,508 to Grifo, Mayhew, Stefcik and Woodward, dated Feb. 25, 1964, and in U.S. Pat. Nos. 3,004,056 and 3,004,057 to Nunn and Hesse, dated Oct. 10, 1961.

In general, the polyoxyalkylene ether phosphates are prepared by reaction of phosphorous pentoxide, orthophosphoric acid, pyrophosphoric acid, or a polyphosphoric acid with a suitable nonionic surfactant base.

In the course of the esterification, monoesters and diesters may both be formed, but one may be obtained in preference to the other, according to the reaction conditions and the molar proportions of the reactants. Phosphate esters composed of the mixtures of the mono- and di-esters in any proportion can be employed, but it is generally preferred that the major proportion, if not all, of the phosphate ester be composed of mono-esters.

It may also be noted that the oxypropylene phosphate esters have a lesser foaming tendency than the oxyethylene phosphate esters, and may be preferred for low foaming compositions. Moreover, the lower the value of n and the higher the number of carbon atoms in the R substituent of the oxyalkylene group, the less the foaming tendency of the phosphate ester.

Exemplary organic compounds having an active hydrogen atom that can be employed to produce alkylene oxide adducts for the radical of the oxyalkylene phosphate esters ($R_3$ in the formula

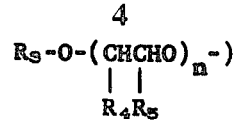

are the primary alcohols such as octanol, decanol, lauryl alcohol, myristyl alcohol, cetyl alcohol, stearyl alcohol, oleyl alcohol, eicosanol, docosanol, tetracosanol, straight or branched, primary or secondary OXO-alcohols, i.e., alcohols prepared by the OXO process, having from twelve to twenty-six carbon atoms, such as the essentially straight chain alcohols produced from Fischer-Tropsch olefins by the OXO-process, and multi-branched chain alcohols produced from olefins having at least seven carbon atoms and two side chains, such as tripropylene, tetrapropylene, pentapropylene, diisobutylene and triisobutylene by the OXO process, mono- di and trialkyl phenols, such as octyl phenol, isooctyl phenol, nonyl phenol, dodecyl phenol, dioctyl phenol, dinonyl phenol, didodecyl phenol, trioctyl phenol, trihexyl phenol, tridodecyl phenol, methyloctyl phenol, and ethylisononyl phenol, tri-primary, secondary, and tertiary butyl phenol, 3-methyl-4,6-dibutyl phenol, octadecyl phenol, di-octadecyl phenol, trioctadecyl phenol, mono-, di- and tributyl cresol, mono-, di-, and trinonyl cresol.

The polyoxyalkylene base

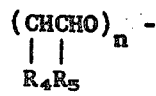

can be polyoxy-1,2-propylene; polyoxyethylene; polyoxy-1,2-butylene; polyoxy-2,3-butylene; the so-called Pluronic type of nonionic surfactants, generally block copolymers of a polyoxyethylene chain and a polymerized alkylene oxide of at least three carbon atoms, preferably 1,2-propylene oxide, ranging in molecular weight from about 300 to about 10,000. Thus, the alkylene oxide condensate may consist entirely of one alkylene oxide, or of a condensed mixture of two or more alkylene oxides, such as a mixture of ethylene oxide and propylene oxide, in blocks, or heterogeneously distributed in the oxyalkylene chain.

The anionic sulphate or sulphonate surfactant constitute a well known class of surfactants. The alkyl aryl sulfonates are defined by the formula

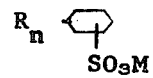

where R is an alkyl radical from 8 to about 18 carbons, n is the number of radicals from one to three, and M is hydrogen or an alkali metal, ammonium or organic amine cation. One example thereof is sodium dodecyl benzene sulfonate.

Another example are the sulfonated phenyl polypropylene alkanes, characterized by the branched chain structure of polypropylene and tertiary alkyl carbon at the benzene ring, and having the following general structure:

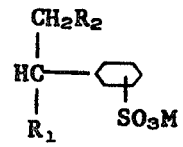

where $M$ is hydrogen, an alkali metal, ammonium, or an organic amine cation, $R_1$ and $R_2$ are alkyl, of the type formula $C_nH_{2n+1}$, and at least one $R$ is a polypropylene group, the whole alkyl group containing preferably 12 to 15 carbon atoms. These are known compounds, whose preparation and properties are set forth in U.S. Pat. No. 2,477,383, to Lewis, issued July 26, 1949; they are available in commerce under the trade names "Oronite," "Ultrawet," and "Neolene."

Other water-soluble alkyl aromatic sulfonic acids include those prepared by alkylating benzene or naphthalene with a kerosene fraction, followed by sulfonation to aromatic sulfonic acids, such as sodium keryl benzene sulfonate.

Other suitable anionic surfactants for controlling and adjusting the foaming power to a desired level are the aliphatic hydrocarbon sulfonates, which have the general formula:

$$R—SO_3M$$

where $R$ is a straight or branched, saturated or unsaturated hydrocarbon radical having from about 12 to about 22 carbon atoms, and $M$ is an alkali metal, ammonia or alkanolamine radical. Belonging to this group are alkyl sulphonates based on the corresponding paraffins, petroleum sulfonates, and alkenyl sulphonates based on the corresponding $\alpha$-olefins.

Further suitable anionic surfactants have the general formula:

$$R—O—(C_2H_4O)_nSO_3M$$

where $R$ is a straight or branched, saturated or unsaturated hydrocarbon radical having from about 8 to about 22 carbon atoms, or an alkyl-substituted phenol having from about 8 to about 22 carbon atoms in its alkyl portion, $n$ is a number from 1 to about 6, and $M$ is an alkali metal, ammonia or alkanolamine radical. Alcohols or phenols suitable as the basis for these compounds are the alcohols and phenols mentioned hereinbefore. The sulphonates and sulphates indicated are prepared in a manner known per se by the use of a sulphonating or sulphating agent, respectively, which is suitable for the type concerned.

Another class of useful surfactants are the amidoalkane sulfonates, which are characterized by the following structure:

$$R—CO—\underset{\underset{R'}{|}}{N}—(CH_2)_n\ SO_3A$$

where $A$ is hydrogen or an alkali metal, i.e., ammonium, sodium or potassium, $n$ is a small whole number from 1 to about 5, preferably 2 or 3, $R$ is hydrogen or an alkyl, aryl, or cycloaliphatic group, such as methyl, and $R'$ is an alkyl or alkylene radical, such as myristyl, palmityl, oleyl and stearyl. Sodium palmitic tauride, sodium palmitic methyl tauride, sodium myristic methyl tauride, sodium palmiticstearic methyl tauride and sodium palmitic methyl amidopropane sulfonate are typical examples thereof.

These compounds are prepared by interacting the corresponding aliphatic acid anhydride or halide with an organic aliphatic aminosulfonic acid, such as taurine, $NH_2CH_2CH_2SO_3H$, and various N-substituted taurines, such as N-methyl taurine or aminopropane sulfonic acid, $NH_2(CH_2)_3SO_3H$.

Other anionic surfactants include esters of sulfuric acid with aliphatic alcohols of about 10 to about 18 carbon atoms, particularly those derived by reduction of oleic acid, tall oil, turkey red oil, and the fatty acids derived from coconut oil, palm oil, sperm oil, and the like long-chain fatty acids, sulfonated castor oil, esters and ethers of isethionic acid, long-chain fatty acid esters and long-chain alkyl ethers of 2,3-dihydroxypropane sulfonic acid, sulfuric acid esters of monoglycerides and glycerol monoesters, sulphosuccinates, naphthalene sulphonates, etc., as well as other types of surfactants such as soaps, alkylether carboxylic acids, alkyl betaines, alkyl sulphobetaines, alone or in combination with each other. The anionic surfactants can be used alone, as well as in admixture.

The nonionic surfactants which have been found to give a foam-reducing effect in combination with the etherphosphate esters indicated are of the following formula:

$$R—O—(C_2H_4O)_nY$$

where $R$ is straight or branched, saturated or unsaturated, primary or secondary alkyl radical having, in all, 8 to 26 carbon atoms, or a mono, di, or trialkyl-substituted phenol having from about 6 to about 24 carbon atoms in its alkyl portion, $n$ is a number ranging from 1 to about 50, and $Y$ is hydrogen or the group $—(C_3H_6O)_mH$, where $m$ is a number ranging from 1 about 10.

Exemplary organic compounds that can be employed to produce such alkylene oxide adducts are the primary alcohols, such as octanol, decanol, lauryl alcohol, stearyl alcohol, oleyl alcohol, eicosanol, docosanol, tetracosanol, straight or branched, primary or secondary OXO-alcohols, i.e., alcohols prepared by the OXO process, having from 12 to 26 carbon atoms, such as the essentially straight chain alcohols produced from Fischer-Tropsch olefins by the OXO-process, and multi-branched chain alcohols produced from olefins having at least 7 carbon atoms and two side chains, such as tripropylene, tetrapropylene, pentapropylene, diisobutylene and triisobutylene by the OXO process, mono-, di- and trialkyl phenols, such as octyl phenol, isooctyl phenol, nonyl phenol, dodecyl phenol, dioctyl phenol, dinonyl phenol, didodecyl phenol, trioctyl phenol, trihexyl phenol, tridodecyl phenol, methyloctyl phenol, and ethylisononyl phenol, tri-primary, secondary, and tertiarybutyl phenol, 3-methyl-4,6-dibutyl phenol, octadecyl phenol, di-octadecyl phenol, trioctadecyl phenol, mono-, di- and tributyl cresol, mono-, di-, and trinonyl cresol.

Further suitable nonionic surfactants have the general formula:

$$H(OC_2H_4)_{n_1}—(OC_3H_6)_{m_1}—OC_{2-3}H_{4-6}O(C_3H_6O)_{m_2}—(C_2H_4O)_{n_2}$$

where $m_1$ and $m_2$ are numbers ranging from about 10 to about 50, and $n_1$ and $n_2$ are numbers ranging from 1 to about 50. Examples of surfactants according to this formula are block copolymers of ethylene oxide and propylene oxide based on propylene glycol and having added to them propylene oxide up to a molecular weight of from about 1000 to about 3000, after which ethylene oxide has been added to cause the proportion of ethylene oxide to constitute 5 to 80% of the molecular weight of the compound such as, for example, the compounds marketed by Wyandotte under the trade name Pluronic.

The production of these nonionic compounds is carried out in a manner known per se at elevated temperature and pressure using an alkaline or acid catalyst by adding alkylene oxide to the corresponding alcohol or alkyl phenol.

In addition to the three surfactants, which are the essential ingredients of the compositions of the invention, the compositions can include other components which are customary in synthetic detergent formulations, such as inorganic and organic complex forming agents, neutral builder salts, soil suspending agents, optical brightening agents, coloring agents and pigments, and perfumes.

Inorganic and organic chelating agents are added for softening hard waters and for improving the soil-removal power of the detergent, particularly for heavily soiled articles. The amount of the alkaline inorganic complex forming agents is usually within the range from about 10 to about 80% by weight of the total solids of the composition, preferably from 20 to 60% by weight. The alkali metal polyphosphates are particularly advantageous in contributing heavy duty performance and in improving detergent properties in hard water. Such polyphosphates include pentasodium tripolyphosphate, sodium acid tripolyphosphate, pentapotassium tripolyphosphate, tetrasodium and tetrapotassium pyrophosphate, sodium tetraphosphate, sodium hexametaphosphate, and pentaammonium tripolyphosphate. Also organic complex forming agents of the type aminopolycarboxylic acids, such as ethylenediaminetetraacetic acid, nitrilotriacetic acid and their alkaline salts are very usable. Still another type of advantageous complex forming agents are the polyelectrolytes such as polyacrylates, polyitaconates and starch derivatives.

The alkali metal silicates, borates, and carbonates also can be employed, alone or in admixture with polyphosphates as alkaline builder salts. Examples are the sodium silicates, borax, and sodium carbonate.

Neutral builder salts such as sodium sulphate and potassium sulphate are formed in the neutralization of the sulphate or sulphonate ester detergents and are usually present in admixture with such detergents. Additional amounts of such sulphates can be added, if desired, to build or extend the composition.

Soil-suspending agents also can be added, particularly for heavy duty formulations. Suitable soilsuspending agents are sodium carboxymethyl cellulose, sodium cellulose sulphate, lower alkyl and hydroxy alkyl cellulose ethers, such as ethyl hydroxyethyl cellulose, ethyl hydroxypropyl cellulose, hydroxyethyl cellulose, methyl cellulose and hydroxypropyl cellulose, as well as polyvinyl alcohol and polyvinylpyrrolidone. Soil suspending agents are usually used, if at all, in amounts of from about 0.05 to about 5%, preferably from 0.1 to 2%, by weight of the total solids.

Optical brightening agents that may be used include stilbines, diamino-stilbines, acylated cyanuric and triazalyl derivatives of stilbines, diphenyl derivatives, dibenzothiophene derivatives, aminocoumarone salts, derivatives of azotized amino-containing benzoazoles, benzthiazoles, and benzimidazoles. A number of such agents are disclosed in U.S. Pat. No. 3,122,508.

The compositions of the invention are useful as wetting agents, re-wetting agents, penetration agents, emulsifiers, leveling agents, dispersing agents, and washing and cleaning agents or detergents, in a great variety of formulations, such as in cosmetics, adhesives, water-softening compositions, and detergent formulations.

The compositions of the invention can thus be used for washing and cleaning a variety of materials, such as textiles, metals, plastics, leather, wood, stone, glass, porcelain, painted surfaces, tile, both in household and industrial applications. They can also be used for wetting or re-wetting and penetration, respectively, of materials such as textiles, metals, plastics, wax, wood, stone, paper, paints, lacquers, pigments, leather, cement, concrete, glass, porcelain, pulverulent chemical compounds and for emulsifying and dispersing solvents, oils, fats, waxes, tars, resins, plastics, softeners, biocides, bactericides, and fungicides, and also as a softener and anti-static agent for textiles, paper, plastics, materials, leather and the like. They also serve as emulsion-polymerization emulsifiers, emulsion breakers, foam controllers, for foamed rubber and foamed plastics, crystallization modifiers, resin removers in the cellulose and paper-making industry, and spinning adjuvants in the rayon industry.

The compositions of the invention for detergent use can be formulated as solutions or slurries which are spray-dried, or as light-duty or heavy-duty concentrated detergent solutions or concentrates. The compositions can also be formed into granules, flakes, chips and powders, using conventional techniques, or plodded to form bars or cakes.

The following Examples in the opinion of the inventors represent preferred embodiments of the invention.

EXAMPLE 1

A series of 16 detergent formulations was prepared, having the following composition, and differing only in the surfactant employed. The surfactants employed are listed in Table I.

| Component | Parts by weight |
|---|---|
| Surfactant | 700 |
| Sodium tripolyphosphate | 2000 |
| Sodium carbonate | 500 |
| Sodium bicarbonate | 250 |
| Sodium sulphate | 700 |
| Sodium silicate | 750 |
| Sodium carboxymethyl cellulose | 100 |

The foaming properties of this formulation were tested in aqueous solution containing 5 grams per liter of the composition. The height of the foam of the composition was measured in a mechanical foaming apparatus, in order to simulate the practical conditions under which the detergent system was to be employed. The method employed is described in Seifen-Öle-Fette-Wasche, 1965, No. 25, p. 913–917, "Messmethode zur Testung gesteuerter Schäume".

The water used in the test was 5° of German hardness, and the washing temperature was between 30° and 90° C. The maximum foam height (in mm) obtained within this temperature range was noted, and is listed in Table I. In this test, a foam height of 200 mm or higher will cause an overflow of foam in most types of washing machines. The maximum foam height that can be produced in the test equipment is 400 mms.

TABLE I

| No. | Surfactant | | Quantity mg/l | Maximum foam height (mms)[2] |
|---|---|---|---|---|
| 1 | A | Sulphate ester of tallow fatty alcohol adduct with 2 mols of EO[1] | 700 | 400 |
| 2 | B | Tallow fatty alcohol adduct with 8 mols of EO[1] | 700 | 200 |
| 3 | C | Phosphate ester of stearyl alcohol adduct with 2.0 mols of PO[1] | 700 | 10 |
| 4 | A<br>B | | 500<br>200 | 400 |
| 5 | A<br>B | | 350<br>350 | 400 |
| 6 | A<br>B | | 200<br>500 | 400 |
| 7 | A<br>C | | 500<br>200 | 130 |
| 8 | A<br>C | | 350<br>350 | 140 |
| 9 | A<br>C | | 200<br>500 | 140 |
| 10 | B<br>C | | 500<br>200 | 30 |
| 11 | B<br>C | | 350<br>350 | 30 |
| 12 | B<br>C | | 200<br>500 | 30 |
| 13 | A<br>B<br>C | | 600<br>50<br>50 | 200 |
| 14 | A<br>B<br>C | | 500<br>100<br>100 | 150 |
| 15 | A<br>B<br>C | | 300<br>200<br>200 | 100 |
| 16 | A<br>B<br>C | | 100<br>300<br>300 | 50 |

[1] EO = ethylene oxide, PO = 1,2- propylene oxide
[2] 400 mm foam = overfoaming It is apparent from the data for No. 1 that the anionic tallow polyoxyethylene sulphate ester surfactant gives a very high foam volume and this cannot be controlled by mixing it either with the nonionic tallow polyoxyethylene glycol surfactant (Nos. 4 to 6) or with the stearyl polyoxypropylene phosphate ester (Nos. 7 to 9). The nonionic surfactant and phosphate ester together (Nos. 10 to 12) are too low foaming to be acceptable for most purposes. However, when all three surfactants are combined (Nos. 13 to 16), then the foaming properties of the composition are in direct proportion to the amount of alkylether sulphate, and by adjusting the proportion of the alkylether sulphate, it is possible to obtain any desired foam volume. It is apparent that the ratio of the nonionic surfactant to the alkylether phosphate ester may be varied without affecting the foam volume.

EXAMPLE 2

A series of sixteen detergent formulations was prepared, having the following composition, and differing only in the surfactant employed. The surfactants employed are listed in Table I.

| Component | Parts by weight |
|---|---|
| Surfactant | 700 |
| Sodium tripolyphosphate | 2000 |
| Sodium carbonate | 500 |
| Sodium bicarbonate | 250 |
| Sodium sulphate | 700 |
| Sodium silicate | 750 |
| Sodium carboxymethyl cellulose | 100 |

The foaming properties of this formulation were tested in aqueous solution containing 5 grams per liter of the composition. The height of the foam of the composition was measured in a mechanical foaming apparatus, in order to simulate the practical conditions under which the detergent system was to be employed. The method employed as described in Seifen-Öle-Fette-Wasche, 1965, No. 25, p. 913–917, "Messmethode zur Testung gesteuerter Schäume".

The water used in the test was 5° of German hardness, and the washing temperature was between 30° and 90° C. The maximum foam height (in mm) obtained within this temperature range was noted, and is listed in Table I. In this test, a foam height of 200 mm or higher will cause an overflow of foam in most types of washing machines. The maximum foam height that can be produced in the test equipment is 400 mms.

TABLE II

| No. | Surfactant | | Quantity mg/l | Maximum foam height (mms)[2] |
|---|---|---|---|---|
| 1 | D | Dodecylbenzene sulphonate | 700 | 400 |
| 2 | E | Tallow fatty alcohol adduct with 8 mols of EO[1] | 700 | 200 |
| 3 | F | Phosphate ester of cetyl alcohol adduct with 2 mols of PO[1] | 700 | 10 |
| 4 | D<br>E | | 500<br>200 | 400 |
| 5 | D<br>E | | 350<br>350 | 400 |
| 6 | D<br>E | | 200<br>500 | 400 |
| 7 | D<br>E | | 500<br>200 | 200 |
| 8 | D<br>F | | 350<br>350 | 200 |
| 9 | D<br>F | | 200<br>500 | 200 |
| 10 | E<br>F | | 500<br>200 | 10 |
| 11 | E<br>F | | 350<br>350 | 10 |
| 12 | E<br>F | | 200<br>500 | 10 |
| 13 | D<br>E<br>F | | 600<br>50<br>50 | 180 |
| 14 | D<br>E<br>F | | 400<br>150<br>150 | 140 |
| 15 | D<br>E<br>F | | 200<br>250<br>250 | 60 |
| 16 | D<br>E<br>F | | 100<br>300<br>300 | 20 |

[1] EO = ethylene oxide, PO = 1,2- propylene oxide.
[2] 400 mm foam = overfoaming It is apparent from the data in No. 1 that the anionic dodecyl benzene sulphonate surfactant has a very high foam volume and that this cannot be reduced (Nos. 4 to 6) by adding a nonionic tallow polyoxyethylene glycol surfactant (Nos. 7 to 9) or stearyl polyoxyethylene phosphate ester to it. The combinations of nonionic surfactant and phosphate ester (Nos. 10 to 12) is too low foaming to be acceptable for most purposes. When, however, all three surfactants are combined (Nos. 13 to 16), then, the foam volume obtained is in direct proportion to the amount of alkylaryl sulphonate, and is not varied by varying the relative proportions of nonionic surfactant and alkylether phosphate ester.

EXAMPLE 3

A series of 16 detergent formulations was prepared, having the following composition, and differing only in the surfactant employed. The surfactants employed are listed in Table I.

| Component | Parts by weight |
| --- | --- |
| Surfactant | 700 |
| Sodium tripolyphosphate | 2000 |
| Sodium carbonate | 500 |
| Sodium bicarbonate | 250 |
| Sodium sulphate | 700 |
| Sodium silicate | 750 |
| Sodium carboxymethyl cellulose | 100 |

The foaming properties of this formulation were tested in aqueous solution containing 5 grams per liter of the composition. The height of the foam of the composition was measured in a mechanical foaming apparatus, in order to simulate the practical conditions under which the detergent system was to be employed. The method employed is described in Seifen-Öle-Fette-Wasche, 1965, No. 25, p. 913–917, "Messmethode zur Testung gesteuerter Schäume".

The water used in the test was 5° of German hardness, and the washing temperature was between 30° and 90°C. The maximum foam height (in mm) obtained within this temperature range was noted, and is listed in Table III. In this test, a foam height of 200 mm or higher will cause an overflow of foam in most types of washing machines.

TABLE III

| No. | Surfactant | | Quantity mg/l | Maximum foam height (mms)[2] |
| --- | --- | --- | --- | --- |
| 1 | G | $C_{15}$-$C_{18}$-olefin sulphonate | 700 | 400 |
| 2 | H | Tallow fatty alcohol adduct with 8 mols of EO[1] | 700 | 200 |
| 3 | I | Phosphate ester of tallow fatty alcohol adduct with 1.2 mols of EO[1] | 700 | 20 |
| 4 | G | | 500 | 400 |
|   | H | | 200 | |
| 5 | G | | 350 | 400 |
|   | H | | 350 | |
| 6 | G | | 200 | 400 |
|   | H | | 500 | |
| 7 | G | | 500 | 400 |
|   | I | | 200 | |
| 8 | G | | 350 | 200 |
|   | I | | 350 | |
| 9 | G | | 200 | 200 |

TABLE III-Continued

| No. | Surfactant | Quantity mg/l | Maximum foam height (mms)[2] |
| --- | --- | --- | --- |
|   | I | 500 | |
| 10 | H | 500 | 10 |
|   | I | 200 | |
| 11 | H | 350 | 10 |
|   | I | 350 | |
| 12 | H | 200 | 10 |
|   | I | 500 | |
| 13 | G | 500 | 170 |
|   | H | 100 | |
|   | I | 100 | |
| 14 | G | 400 | 130 |
|   | H | 150 | |
|   | I | 150 | |
| 15 | G | 300 | 40 |
|   | H | 200 | |
|   | I | 200 | |

[1] EO = ethylene oxide, PO = 1,2 - propylene oxide.
[2] 400 mm foam = overfoaming It is apparent from No. 1 that the anionic pentadecylene to octadecylene sulphonate surfactant has a very high foam volume, and this cannot be reduced appreciably by combining it with the nonionic tallow polyoxyethylene glycol surfactant (Nos. 4 to 6) or with the tallow polyoxyethylene phosphate ester surfactant (Nos. 7 to 9). The combination of nonionic surfactant and phosphate ester (Nos. 10 to 12) is too low foaming to be acceptable for most purposes. When, however, all three surfactants are combined (Nos. 13 to 15), then the foam volume is in direct proportion to the amount of olefin sulphonate, and the relative proportions of nonionic surfactant and the phosphate ester can be varied without affecting foam volume.

EXAMPLE 4

A series of 16 detergent formulations was prepared, having the following composition, and differing only in the surfactant employed. The surfactants employed are listed in Table IV.

| Component | Parts by weight |
| --- | --- |
| Surfactant | 700 |
| Sodium tripolyphosphate | 500 |
| Trisodium nitrilotriacetic acid | 1000 |
| Sodium carbonate | 500 |
| Sodium bicarbonate | 250 |
| Sodium sulphate | 700 |
| Sodium silicate | 750 |
| Sodium carboxymethyl cellulose | 100 |

The foaming properties of this formulation were tested in aqueous solution containing 5 grams per liter of the composition. The height of the foam of the composition was measured in a mechanical foaming apparatus, in order to simulate the practical conditions under which the detergent system was to be employed. The method employed is described in Seifen-Öle-Fette-Wasche, 1965, No. 25, p. 913–917, "Messmethode zur Testung gesteuerter Schäume."

The water used in the test was 5° of German hardness, and the washing temperature was between 30° and 90°C. The maximum foam height (in mm) obtained within this temperature range was noted, and is listed in Table IV. In this test, a foam height of 200 mm or higher will cause an overflow of foam in most types of washing machines.

TABLE IV

| No. | Surfactant | | Quantity mg/l | Maximum foam height (mms)[2] |
|---|---|---|---|---|
| 1 | A | Sulphate ester of tallow fatty alcohol adduct with 2 mols of EO[1] | 700 | 400 |
| 2 | B | Tallow fatty alcohol adduct with 8 mols of EO[1] | 700 | 200 |
| 3 | C | Phosphate ester of stearyl alcohol adduct wtih 2.0 mols of PO[1] | 700 | 10 |
| 4 | A B | | 500 200 | 400 |
| 5 | A B | | 350 350 | 400 |
| 6 | A B | | 200 500 | 400 |
| 7 | A C | | 500 200 | 140 |
| 8 | A C | | 350 350 | 140 |
| 9 | A C | | 200 500 | 140 |
| 10 | B C | | 500 200 | 30 |
| 11 | B C | | 350 350 | 30 |
| 12 | B C | | 200 500 | 30 |
| 13 | A B C | | 600 50 50 | 200 |
| 14 | A B C | | 500 100 100 | 150 |
| 15 | A B C | | 300 200 100 | 100 |
| 16 | A B C | | 100 300 300 | 50 |

[1] EO = ethylene oxide, PO = 1,2-propylene oxide
[2] 400 mm foam = overfoaming

It is apparent from the data for No. 1 that the anionic tallow polyoxyethylene sulphate surfactant gives a very high foam volume and this cannot be controlled by mixing it either with the nonionic tallow polyoxyethylene glycol surfactant (Nos. 4 to 6) or with the stearyl polyoxypropylene phosphate ester (Nos. 7 to 9). The nonionic surfactant and phosphate ester together (Nos. 10 to 12) are too low foaming to be acceptable for most purposes. However, when all three surfactants are combined (Nos. 13 to 16), then the foaming properties of the composition are in direct proportion to the amount of alkylether sulphate, and by adjusting the proportion of the alkylether sulphate, it is possible to obtain any desired foam volume. It is apparent that the ratio of the nonionic surfactant to the alkylether phosphate ester may be varied without affecting the foam volume.

EXAMPLE 5

A series of 16 detergent formulations was prepared, having the following composition, and differing only in the surfactant employed. The surfactants employed are listed in Table V.

| Component | Parts by weight |
|---|---|
| Surfactant | 70 |
| Sodium tripolyphosphate | 50 |
| Trisodium nitrilotriacetic acid | 1000 |
| Sodium carbonate | 50 |
| Sodium bicarbonate | 25 |
| Sodium sulphate | 70 |
| Sodium silicate | 75 |
| Sodium carboxymethyl cellulose | 10 |

The foaming properties of this formulation were tested in aqueous solution containing 5 grams per liter of the composition. The height of the foam of the composition was measured in a mechanical foaming apparatus, in order to simulate the practical conditions under which the detergent system was to be employed. The method employed is described in Seifen-Öle-Fette-Wasche, 1965, No. 25, p. 913–917, "Messmethode zur Testung gesteuerter Schäume".

The water used in the test was 5° of German hardness, and the washing temperature was between 30° and 90° C. The maximum foam height (in mm) obtained within this temperature range was noted, and is listed in Table V. In this test, a foam height of 200 mm or higher will cause an overflow of foam in most types of washing machines.

TABLE V

| No. | Surfactant | | Quantity mg/l | Maximum foam height (mms)[2] |
|---|---|---|---|---|
| 1 | A | Sodium dodecyl benzene sulphonate | 700 | 400 |
| 2 | B | Tallow fatty alcohol adduct with 8 mols of EO[1] | 700 | 200 |
| 3 | C | Phosphate ester of cetyl alcohol adduct with 2 mols of PO[1] | 700 | 10 |
| 4 | A B | | 500 200 | 400 |
| 5 | A B | | 350 350 | 400 |
| 6 | A B | | 200 500 | 400 |
| 7 | A C | | 500 200 | 200 |
| 8 | A C | | 350 350 | 200 |
| 9 | A C | | 200 500 | 200 |
| 10 | B C | | 500 200 | 10 |
| 11 | B C | | 350 350 | 10 |
| 12 | B C | | 200 500 | 10 |
| 13 | A B C | | 600 50 50 | 180 |
| 14 | A B C | | 400 150 150 | 140 |
| 15 | A B C | | 200 250 250 | 60 |
| 16 | A B C | | 100 300 300 | 20 |

[1] EO = ethylene oxide, PO = 1,2-propylene oxide
[2] 400 mm foam = overfoaming

It is apparent from the data for No. 1 that the anionic sodium dodecyl benzene sulphate surfactant gives a very high volume and this cannot be controlled by mixing it either with the nonionic tallow polyoxyethylene glycol surfactant (Nos. 4 to 6) or with the cetyl polyoxypropylene phosphate ester (Nos. 7 to 9). The nonionic surfactant and phosphate ester together (Nos. 10 to 12) are too low foaming to be acceptable for most purposes. However, when all three surfactants are combined (Nos. 13 to 16), then the foaming properties of the composition are in direct proportion to the amount of dodecyl benzene sulphonate and by adjusting the proportion of the dodecyl benzene sulphonate, it is possible to obtain any desired foam volume. It is apparent that the ratio of the nonionic surfactant to the alkylether phosphate ester may be varied without affecting the foam volume.

EXAMPLE 6

A series of 16 detergent formulations was prepared, having the following composition, and differing only in the surfactant employed. The surfactants employed are listed in Table VI.

| Component | Parts by weight |
| --- | --- |
| Surfactant | 700 |
| Sodium tripolyphosphate | 500 |
| Trisodium nitrilotriacetic acid | 1000 |
| Sodium carbonate | 500 |
| Sodium bicarbonate | 250 |
| Sodium sulphate | 700 |
| Sodium silicate | 750 |
| Sodium carboxymethyl cellulose | 100 |

The foaming properties of this formulation were tested in aqueous solution containing 5 grams per liter of the composition. The height of the foam of the composition was measured in a mechanical foaming apparatus, in order to simulate the practical conditions under which the detergent system was to be employed. The method employed is described in Seifen-Öle-Fette-Wasche, 1965, No. 25, p. 913–917, "Messmethode zur Testung gesteuerter Schäume".

The water used in the test was 5° of German hardness, and the washing temperature was between 30° and 90° C. The maximum foam height (in mm) obtained within this temperature range was noted, and is listed in Table VI. In this test, a foam height of 200 mm or higher will cause an overflow of foam in most types of washing machines.

TABLE VI

| No. | Surfactant | | Quantity mg/l | Maximum foam height (mms)[2] |
| --- | --- | --- | --- | --- |
| 1 | G | $C_{15}$-$C_{18}$-olefin sulphonate | 700 | 400 |
| 2 | H | Tallow fatty alcohol adduct with 8 mols of EO[1] | 700 | 200 |
| 3 | I | Phosphate ester of tallow fatty alcohol adduct with 12 mols of EO[1] | 700 | 20 |
| 4 | | G | 500 | 400 |
| | | H | 200 | |
| 5 | | G | 350 | 200 |
| | | H | 350 | |
| 6 | | G | 200 | 200 |
| | | H | 500 | |
| 7 | | G | 500 | 400 |

TABLE VI-Continued

| No. | Surfactant | Quantity mg/l | Maximum foam height (mms)[2] |
| --- | --- | --- | --- |
| | I | 200 | |
| 8 | G | 350 | 200 |
| | I | 350 | |
| 9 | G | 200 | 200 |
| | I | 500 | |
| 10 | H | 500 | 10 |
| | I | 200 | |
| 11 | H | 350 | 10 |
| | I | 350 | |
| 12 | H | 200 | 10 |
| | I | 500 | |
| 13 | G | 500 | 170 |
| | H | 100 | |
| | I | 100 | |
| 14 | G | 400 | 130 |
| | H | 150 | |
| | I | 150 | |
| 15 | G | 300 | 40 |
| | H | 200 | |
| | I | 200 | |

[1] EO = ethylene oxide. PO = 1,2 - propylene oxide.
[2] 400 mm foam = overfoaming It is apparent from No. 1 that the anionic pentadecylene to octadecylene sulphonate surfactant tant has a very high foam volume, and this cannot be reduced appreciably by combining it with the nonionic tallow polyoxyethylene glycol surfactant (Nos. 4 to 6) or with the tallow polyoxyethylene phosphate ester surfactant (Nos. 7 to 9). The combination of nonionic surfactant and phosphate ester (Nos. 10 to 12) is too low foaming to be acceptable for most purposes. When, however, all three surfactants are combined (Nos. 13 to 15), then the foam volume is in direct proportion to the amount of olefin sulphonate, and the relative proportions of nonionic surfactant and the phosphate ester can be varied without affecting foam volume.

EXAMPLE 7

A series of 16 detergent formulations was prepared, having the following composition, and differing only in the surfactant employed. The surfactants employed are listed in Table VII.

| Component | Parts by weight |
| --- | --- |
| Surfactant | 700 |
| Sodium tripolyphosphate | 3000 |
| Sodium carbonate (calcined) | 300 |
| Trisodium phosphate | 50 |
| Sodium metasilicate | 300 |

The foaming properties of this formulation were tested in aqueous solution containing 5 grams per liter of the composition. The height of the foam of the composition was measured in a mechanical foaming apparatus, in order to simulate the practical conditions under which the detergent system was to be employed. The method employed is described in Seifen-Öle-Fette-Wasche, 1965, No. 25, p. 913–917, "Messmethode zur Testung gesteuerter Schäume."

The water used in the test was 5° of German hardness, and the washing temperature was between 30° and 90°C. The maximum foam height (in mm) obtained within this temperature range was noted, and is listed in Table VII. In this test, a foam height of 200 mm or higher will cause an overflow of foam in most types of washing machines. The maximum foam height that can be produced in the test equipment is 400 mms.

TABLE VII

| No. | Surfactant | | Quantity mg/l | Maximum foam height (mms)[2] |
|---|---|---|---|---|
| 1 | A | Sodium dodecyl benzene sulfonate | 700 | 400 |
| 2 | B | Nonyl phenol adduct with 10 mols of EO[1] | 700 | 200 |
| 3 | C | Phosphate ester of stearyl alcohol adduct with 8.5 mols of PO[1] | 700 | 25 |
| 4 | A B | | 500 200 | 400 |
| 5 | A B | | 350 350 | 400 |
| 6 | A B | | 200 500 | 400 |
| 7 | A C | | 500 200 | 400 |
| 8 | A C | | 350 350 | 400 |
| 9 | A C | | 200 500 | 400 |
| 10 | B C | | 500 200 | 50 |
| 11 | B C | | 350 350 | 50 |
| 12 | B C | | 200 500 | |
| 13 | A B C | | 500 100 100 | 190 |
| 14 | A B C | | 300 200 200 | 160 |
| 15 | A B C | | 200 200 300 | 150 |
| 16 | A B C | | 100 100 500 | 100 |

[1] EO = ethylene oxide, PO = 1,2-propylene oxide
[2] 400 mm foam = overfoaming

It is apparent from the data for No. 1 that the anionic sodium dodecyl benzene sulphonate surfactant gives a very high foam volume and this cannot be controlled by mixing it either with the nonionic nonyl phenol polyoxyethylene glycol ether surfactant (Nos. 4 to 6) or with the stearyl polyoxypropylene phosphate ester (Nos. 7 to 9). The nonionic surfactant and phosphate ester together (Nos. 10 to 12) are too low foaming to be acceptable for most purposes. However, when all three surfactants are combined (Nos. 13 to 16), then the foaming properties of the composition are in direct proportion to the amount of alkylether sulphate, and by adjusting the proportion of the alkylether sulphate, it is possible to obtain any desired foam volume. It is apparent that the ratio of the nonionic surfactant to the alkylether phosphate ester may be varied without affecting the foam volume.

EXAMPLE 8

A series of 16 detergent formulations was prepared, having the following composition, and differing only in the surfactant employed. The surfactants employed are listed in Table VIII.

| Component | Parts by weight |
|---|---|
| Surfactant | 10 |
| Sodium carbonate (calcined) | 100 |

The foaming properties of this formulation were tested in aqueous solution containing 1.1 grams per liter of the composition. The height of the foam of the composition was measured in a mechanical foaming apparatus, in order to simulate the practical conditions under which the detergent system was to be employed. The method employed is described in Seifen-Öle-Fette-Wasche, 1965, No. 25, p. 913–917, "Messmethode zur Testung gesteuerter Schäume".

The water used in the test was 5° of hardness, and the washing temperature was between 30° and 90° C. The maximum foam height (in mm) obtained within this temperature range was noted, and is listed in Table VIII. In this test, a foam height of 200 mm or higher will cause an overflow of foam in most types of washing machines.

TABLE VIII

| No. | Surfactant | | Quantity mg/l | Maximum foam height (mms)[2] |
|---|---|---|---|---|
| 1 | A | Sulphate ester of n-primary $C_{16}$-$C_{20}$ fatty alcohol adduct with 3 mols of EO[1] | 500 | 400 |
| 2 | B | n-Primary $C_{16}$-$C_{20}$ fatty alcohol adduct with 30 mols of EO[1] | 500 | 250 |
| 3 | C | Phosphate ester of n-primary $C_{20}$-$C_{22}$ alcohol adduct with 3 mols of EO[1] | 500 | 20 |
| 4 | A B | | 400 100 | 400 |
| 5 | A B | | 250 250 | 400 |
| 6 | A B | | 100 400 | 400 |
| 7 | A C | | 400 100 | 180 |
| 8 | A C | | 250 250 | 160 |
| 9 | A C | | 100 400 | 160 |
| 10 | B C | | 400 100 | 40 |
| 11 | B C | | 250 250 | 30 |
| 12 | B C | | 100 400 | 30 |
| 13 | A B C | | 400 50 50 | 180 |
| 14 | A B C | | 300 100 100 | 150 |
| 15 | A B C | | 200 150 150 | 100 |
| 16 | A B C | | 100 200 200 | 50 |

[1] EO = ethylene oxide, PO = 1,2-propylene oxide
[2] 400 mm foam = overfoaming

It is apparent from the data for No. 1 that the anionic $C_{16}$—$C_{20}$ alcohol polyoxyethylene sulphate ester surfactant gives a very high foam volume and this cannot be controlled by mixing it either with the nonionic $C_{16}$—$C_{20}$ alcohol polyoxyethylene glycol surfactant (Nos. 4 to 6) or with the $C_{20}$—$C_{22}$ alcohol polyoxyethylene phosphate ester (Nos. 7 to 9). The nonionic surfactant and phosphate ester together (Nos. 10 to 12) are too low foaming to be acceptable for most purposes. However, when all three surfactants are combined (Nos. 13 to 16), then the foaming properties of the composition are in direct proportion to the amount of alkylether sulphate, and by adjusting the proportion of the alkylether sulphate, it is possible to obtain any desired foam volume. It is apparent that the ratio of the nonionic surfactant to the alkylether phosphate ester may be varied without affecting the foam volume.

EXAMPLE 9

A series of 16 detergent formulations was prepared, having the following composition, and differing only in the surfactant employed. The surfactants employed are listed in Table IX.

| Component | Parts by weight |
|---|---|
| Surfactant | 700 |
| Sodium tripolyphosphate | 2000 |
| Sodium carbonate | 500 |
| Sodium bicarbonate | 250 |
| Sodium sulphate | 700 |
| Sodium silicate | 750 |
| Sodium carboxymethyl cellulose | 100 |

The foaming properties of this formulation were tested in aqueous solution containing 0.5 gram per liter of the composition. The height of the foam of the composition was measured in a mechanical foaming apparatus, in order to simulate the practical conditions under which the detergent system was to be employed. The method employed is described in Seifen-Öle-Fette-Wasche, 1965, No. 25, p. 913–917, "Messmethode zur Testung gesteuerter Schäume".

The water used in the test was 5° of German hardness, and the washing temperature was between 30° and 90° C. The maximum foam height (in mm) obtained within this temperature range was noted, and is listed in Table IX. In this test, a foam height of 200 mm or higher will cause an overflow of foam in most types of washing machines.

TABLE IX

| No. | | Surfactant | Quantity mg/l | Maximum foam height (mms)[2] |
|---|---|---|---|---|
| 1 | A | Di- n-primary $C_{12}$-$C_{18}$ fatty alcohol sulphosuccinate (1:1) | 700 | 400 |
| 2 | B | Tridecyl alcohol adduct with 8 mols of EO[1] | 700 | 200 |
| 3 | C | Phosphate ester of lauryl alcohol adduct with 2 mols of EO[1] | 700 | 50 |
| 4 | | A | 500 | 400 |
| | | B | 200 | |
| 5 | | A | 350 | 400 |
| | | B | 350 | |
| 6 | | A | 200 | 400 |
| | | B | 500 | |
| 7 | | A | 500 | 200 |
| | | C | 200 | |
| 8 | | A | 350 | 180 |
| | | C | 350 | |
| 9 | | A | 200 | 180 |
| | | C | 500 | |

TABLE IX-Continued

| No. | Surfactant | Quantity mg/l | Maximum foam height (mms)[2] |
|---|---|---|---|
| 10 | B | 500 | 80 |
| | C | 200 | |
| 11 | B | 350 | 60 |
| | C | 350 | |
| 12 | B | 200 | 60 |
| | C | 500 | |
| 13 | A | 500 | 200 |
| | B | 100 | |
| | C | 100 | |
| 14 | A | 300 | 160 |
| | B | 200 | |
| | C | 200 | |
| 15 | A | 200 | 140 |
| | B | 200 | |
| | C | 300 | |
| 16 | A | 100 | 100 |
| | B | 100 | |
| | C | 500 | |

[1] EO = ethylene oxide, PO = 1,2 - propylene oxide
[2] 400 mm foam = overfoaming It is apparent from the date for No. 1 that the anionic di—$C_{12}$—$C_{18}$ alcohol sulphosuccinate surfactant gives a very high foam volume and this cannot be controlled by mixing it either with the nonionic tridecyl polyoxyethylene glycol surfactant (Nos. 4 to 6) or with the lauryl polyoxyethylene phosphate ester (Nos. 7 to 9). The nonionic surfactant and phosphate ester together (Nos. 10 to 12) are too low foaming to be acceptable for a lot of purposes. However, when all three surfactants are combined (Nos. 13 to 16), then the foaming properties of the composition are in direct proportion to the amount of alkyl sulphate, and by adjusting the proportion of the alkyl sulphate, it is possible to obtain any desired foam volume. It is apparent that the ratio of the nonionic surfactant to the alkylether phosphate ester may be varied without affecting the foam volume.

EXAMPLE 10

Vinyl chloride was polymerized to form polyvinyl chloride in phosphorylated presence of potassium persulphate as a catalyst, and 3% surfactant as an emulsifier. The polymer emulsion that was formed had a solids content of 40%. The surfactant composition was composed of a mixture of 60% lauryl sulphate, 20% ethylene oxide-propylene oxide block copolymer in which the proportion of the ethylene oxide was 20%, and the molecular weight of the propylene oxide component was 1850, and 20% of an alkylether phosphate ester based on nonyl phenol condensed with 10 mols of ethylene oxide and phsphorylated by reaction with phosphorous pentoxide.

Foam testing by shaking cylinders half filled with the polymer emulsion showed that the foaming properties were very low or 10 ml and that is possible to control the foaming by varying the relative proportions of the surfactants, in the manner illustrated in Example 1.

Having regard to the foregoing disclosures, the following is claimed as the inventive, and patentable embodiments thereof:

1. A surface-active composition having controlled foaming properties, and consisting essentially of, in combination, a surfactant selected from the group consisting of anionic sulphonate and sulphate surfactants, a nonionic surfactant selected from the group consisting of polyoxyalkylene ether, -ester and -glycol surfactants, and a polyoxyalkylene phosphate ester surfactant, the combination of the polyoxyalkylene ether, -ester or -glycol surfactant and polyoxyalkylene phosphate ester surfactant having a low foaming property which is controllably increased by the proportion of anionic sulphate or sulphonate surfactant, the relative proportions of the anionic, nonionic and phosphate surfactants falling within the ranges:

|  | % by weight |
| --- | --- |
| Anionic sulphate or sulphonate surfactant | 1 – 95 |
| Nonionic Polyoxyalkylene ether, -ester or -glycol surfactant | 1 – 95 |
| Polyoxyalkylene phosphate ester surfactant | 1 – 95 | the polyoxyalkylene phosphate ester having the formula:

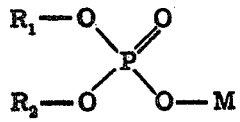

wherein $R_1$ and $R_2$ are selected from hydrogen and polyoxyalkylene ether radicals, and no more than one of $R_1$ and $R_2$ is hydrogen, the polyoxyalkylene ether radical being of the form

wherein $n$ has a value greater than zero up to about 30, and denotes the average number of oxyalkylene units in the chain, $R_4$ and $R_5$ are hydrogen or methyl, and $R_3$ is a primary or secondary straight or branched chain saturated or unsaturated radical having from about 10 to about 24 carbon atoms, or a mono-, di-, or trialkyl-substituted phenyl radical having from about 6 to about 24 carbon atoms; and $M$ is hydrogen or a water-soluble salt-forming cation.

2. A composition according to claim 1 including, in addition, a chelating agent selected from the group consisting of inorganic chelating agents and organic chelating agents selected from aminopolycarboxylic acids and polyelectrolytes selected from the group consisting of polyacrylates, polyitaconates, and starch derivatives, in an amount within the range from about 10 to about 80% by weight of the total solids of the composition.

3. A composition according to claim 1 including, in addition, a soil-suspending agent, in an amount within the range from about 0.05 to about 5% by weight of the total solids of the composition.

4. A composition according to claim 1, in which the relative proportions of the anionic, nonionic and phosphate surfactants fall within the following ranges:

|  | % by weight |
| --- | --- |
| Anionic sulphate or sulphonate surfactant | [1 – 95] 10 – 90 |
| Nonionic polyoxyalkylene ether, -ester or -glycol surfactant | [1 – 95] 10 – 90 |
| Polyoxyalkylene phosphate ester surfactant | [1 – 95] 10 – 90. |

5. A composition according to claim 1 in which any one of $R_4$ and $R_5$ in the polyoxyalkylene ether radical is methyl and the other is hydrogen.

6. A composition according to claim 1 in which the anionic sulphonate surfactant is an alkyl aryl sulfonate having the formula

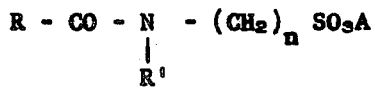

where $R$ is alkyl having from 8 to about 18 carbons, $n$ is a number from one to three, and $M$ is hydrogen or an alkali metal, ammonium or organic amine cation.

7. A composition according to claim 1 in which the anionic sulphonate surfactant is an amidoalkane sulfonate, having the structure:

$$R - CO - N(R') - (CH_2)_n SO_3A$$

where $A$ is hydrogen or an alkali metal or aluminum, $n$ is a small whole number from 1 to about 5, $R$ is hydrogen or an alkyl, aryl, or cycloaliphatic group, and $R'$ is an alkyl or alkylene radical.

8. A composition according to claim 1 in which the anionic surfactant is an ester of sulfuric acid with an aliphatic alcohol of from 10 to 18 carbon atoms.

9. A composition according to claim 1 in which the anionic surfactant is a sulfonate having the following general formula:

$$R—SO_3X$$

where $R$ is a straight or branched, saturated or unsaturated hydrocarbon radical having 12 to 22 carbon atoms, or an alkyl benzene having a straight or branched alkyl containing 12 to 18 carbon atoms, $X$ is an alkali metal, ammonia or alkanolamine-radical.

10. A composition according to claim 1 in which the anionic surfactant is a sulfated alkoxylate having the following general formula:

$$R—O—(C_2H_4O)_nSO_3X$$

where $R$ is a straight or branched, saturated or unsaturated hydrocarbon radical having 8 to 22 carbon atoms, or an alkyl-substituted phenol having 8 to 18 carbon atoms in its alkyl portion, $n$ is a number ranging between 0 and 6, and $X$ is an alkali metal, ammonia or alkanolamine radical.

11. A composition according to claim 1 in which the nonionic surfactant has the following general formula:

$$R—O—(C_2H_4O)_nY$$

where $R$ is a straight or branched, saturated or unsaturated primary or secondary alkyl radical having, in all, 8 to 26 carbon atoms, or a mono-, di- or trialkyl-substituted phenol having, in all, 6 to 24 carbon atoms in its alkyl portion, $n$ is a number ranging from 1 to 50 and Y is hydrogen or the group $-(C_3H_6O)_mH$, where $m$ is a number ranging from 1 to 10.

12. A composition according to claim 1 in which the nonionic surfactant has the following general formula:

$$H(OC_2H_4)_{n_1}-(OC_3H_6)_{m_1}-OC_{2-3}H_{4-6}O(C_3H_6O)_{m_2}-(C_2H_4O)_{n_2}$$

where $m_1$ and $m_2$ are numbers ranging from 10 to 50, and $n_1$ and $n_2$ are numbers ranging from 1 to 50.

13. A composition according to claim 1 including, in addition, an alkali metal polyphosphate in an amount within the range from about 10% to about 80% by weight of the total solids of the composition.

14. A composition according to claim 1 including, in addition, a soil-suspending agent in an amount of from about 0.05% to about 5%, by weight of the total solids, selected from alkali metal carboxymethyl cellulose, alkali metal cellulose sulphate, and lower alkyl and hydroxyalkyl cellulose ethers.

15. A composition according to claim 1, consisting essentially of 70 parts by weight of surfactants, 50 parts by weight sodium tripolyphosphate, 50 parts by weight sodium carbonate, 25 parts by weight sodium bicarbonate, 70 parts by weight sodium sulphate, 75 parts by weight sodium silicate, and 10 parts by weight sodium carboxymethyl cellulose.

16. A composition according to claim 1, including in addition, an amount within the range from about 10% to about 80% by weight of the total solids of the composition of an organic chelating agent selected from aminopolycarboxylic acids and polyelectrolytes selected from the group consisting of polyacrylates, polyitaconates, and starch derivatives.

17. A composition according to claim 14, in which the surfactants are sulphate ester of tallow fatty alcohol adduct with 2 mols of ethylene oxide, tallow fatty alcohol adduct with 8 mols of ethylene oxide and phosphate ester of stearyl alcohol adduct with 2.0 mols of 1,2-propylene oxide.

18. A composition according to claim 15, in which the surfactants are dodecylbenzene sulphonate, tallow fatty alcohol adduct with 8 mols of ethylene oxide and phosphate ester of cetyl alcohol adduct with 2 mols of 1,2-propylene oxide.

19. A composition according to claim 15, in which the surfactants are $C_{15}-C_{18}$ —olefin sulphonate, tallow fatty alcohol adduct with 8 mols of ethylene oxide and phosphate ester of tallow fatty alcohol adduct with 1.2 mols of ethylene oxide.

20. A composition according to claim 15, in which the surfactants are sulphate ester of n-primary $C_{12}-C_{18}$ fatty alcohol and $C_8-C_{18}$ alcohol sulphosuccinate (1:1); tridecyl alcohol adduct with 8 mols of ethylene oxide and phosphate ester of lauryl alcohol adduct with 2 mols of ethylene oxide.

21. A composition according to claim 1, consisting essentially of 70 parts by weight of surfactants, 50 parts by weight sodium tripolyphosphate, 100 parts by weight trisodium nitrilotriacetic acid, 50 parts by weight sodium carbonate, 25 parts by weight sodium bicarbonate, 70 parts by weight sodium sulphate, 75 parts by weight sodium silicate, and 10 parts by weight sodium carboxymethyl cellulose.

22. A composition according to claim 21, in which the surfactants are sulphate ester of tallow fatty alcohol adduct with 2 mols of ethylene oxide, tallow fatty alcohol adduct with 8 mols of ethylene oxide and phosphate ester of stearyl alcohol adduct with 2 mols of 1,2-propylene oxide.

23. A composition according to claim 21, in which the surfactants are sodium dodecyl benzene sulphonate, tallow fatty alcohol adduct with 8 mols of ethylene oxide, and phosphate ester of cetyl alcohol adduct with 2 mols of 1,2-propylene oxide.

24. A composition according to claim 21, in which the surfactants are $C_{15}-C_{18}$ —olefin sulphonate, tallow fatty alcohol adduct with 8 mols of ethylene oxide and phosphate ester of tallow fatty alcohol adduct with 1.2 mols of ethylene oxide.

25. A composition according to claim 1, consisting essentially of 70 parts by weight of surfactants, 300 parts by weight sodium tripolyphosphate, 30 parts by weight sodium carbonate (calcined), 5 parts by weight trisodium phosphate, and 30 parts by weight sodium metasilicate.

26. A composition according to claim 25 in which the surfactants are sodium dodecyl benzene sulfonate, nonyl phenol adduct with 10 mols of ethylene oxide and phosphate ester of stearyl alcohol adduct with 8.5 mols of 1,2- propylene oxide.

27. A composition according to claim 1 consisting essentially of, in addition to the surfactant, sodium carbonate (calcined).

28. A composition according to claim 27, in which the surfactants are sulphate ester of n-primary $C_{16}-C_{20}$ fatty alcohol adduct with 3 mols of ethylene oxide, n-primary $C_{16}-C_{20}$ fatty alcohol adduct with 30 mols of ethylene oxide, and phosphate ester of n-primary $C_{20}-C_{22}$ alcohol adduct with 3 mols of ethylene oxide.

* * * * *

UNITED STATES PATENT OFFICE
CERTIFICATE OF CORRECTION

Patent No. 3,869,412  Dated March 4, 1975

Inventor(s) Ake Waag

It is certified that error appears in the above-identified patent and that said Letters Patent are hereby corrected as shown below:

| | |
|---|---|
| Column 4, line 51 | : following "radical" add -- having -- |
| Column 6, line 58 | : "$H(OC_2H_4)_n - (OC_3H_6)_m - OC_{2-3}H_{4-6}O(C_3H_6O)_m - (C_2H_4O)_n$" should be --$H(OC_2H_4)_{n_1} - (OC_3H_6)_{m_1} - OC_{2-3}H_{4-6}O(C_3H_6O)_{m_2} - (C_2H_4O)_{n_2}$-- |
| Column 9, Table I, line 23 | : add -- 7 -- |
| Column 10 line 19 | : "as" should be --is-- |
| Column 10 Table II, No. 9, line 50, column 4 | : "200" should be -- 200 -- 200 |
| Column 17, line 30, last column (Maximum foam height) | : add -- 50 -- |
| Column 20, line 42 | : omit "phosphorylated" and insert -- the -- before "presence" |
| line 52 | : "phsphorylated" should be --phosphorylated-- |
| Column 21, line 65 to Column 22, line 10 last column of Table Claim 4 | : omit "[ 1 - 95]" each occurrence |

UNITED STATES PATENT OFFICE
CERTIFICATE OF CORRECTION

Patent No. 3,869,412  Dated March 4, 1975

Inventor(s) Ake Waag

It is certified that error appears in the above-identified patent and that said Letters Patent are hereby corrected as shown below:

Column 23, line 7
Claim 12

: "$H(OC_2H_4)_n - (OC_3H_6)_m - OC_{2-3}H_{4-6}O(C_3H_6O)_m - (C_2H_4O)_n$" should be -- $H(OC_2H_4)_{n_1} - (OC_3H_6)_{m_1} - OC_{2-3}H_{4-6}O(C_3H_6O)_{m_2} - (C_2H_4O)_{n_2}$ --

Signed and Sealed this sixteenth Day of March 1976

[SEAL]

Attest:

RUTH C. MASON
*Attesting Officer*

C. MARSHALL DANN
*Commissioner of Patents and Trademarks*